United States Patent

Fitch et al.

[11] 3,892,171
[45] July 1, 1975

[54] APPARATUS FOR MAKING PIZZAS OR THE LIKE

[76] Inventors: Clifford E. Fitch, 279 Homewood Ct.; Clifford E. Fitch, Jr., 38 W. 23rd St., both of Chicago Heights, Ill. 60411

[22] Filed: Sept. 7, 1973

[21] Appl. No.: 395,069

[52] U.S. Cl. .............................. 99/450.7; 222/194
[51] Int. Cl. ............................ A21c 9/04; B67d 5/54
[58] Field of Search ........ 99/450.6, 450.7; 222/194; 141/67

[56] References Cited
UNITED STATES PATENTS

| | | | |
|---|---|---|---|
| 3,272,396 | 9/1966 | Neville | 222/194 |
| 3,348,503 | 10/1967 | Beik | 99/450.7 |
| 3,603,270 | 9/1971 | Tangel | 99/450.6 |
| 3,725,974 | 4/1973 | Kuhlman | 99/450.1 X |
| 3,746,217 | 7/1973 | Hanset | 222/194 |
| 3,780,643 | 12/1973 | Papai | 99/450.7 |

*Primary Examiner*—Harvey C. Hornsby
*Assistant Examiner*—Alan Cantor

[57] ABSTRACT

An apparatus for metering and distributing meat in a desired pattern onto pizzas includes a conveyor for advancing the pizzas and at least one metering and distributing head for the meat above the advancing pizzas on the conveyor. The metering and distributing head comprises a housing including a meat supply station, a meat distributing station having distribution tubes, a metering station having metering pistons and an air supply station, and a movable core in the housing movable between first and second positions. In the first position, the movable core communicates the air supply station with the distributing station for distributing metered portions of meat in a desired pattern onto the pizzas and the metering pistons are retracted to receive meat in the metering station from the supply station. In the second position, the metering pistons are advanced to project metered portions of the meat from the metering station to the distributing station for distribution during the next operating cycle. The core, metering pistons and air supply are operated in timed relation through a complete operating cycle when a pizza appears under the metering and distributing head and repetition of the operating cycle is prevented until another pizza appears under the metering and distributing head.

16 Claims, 8 Drawing Figures

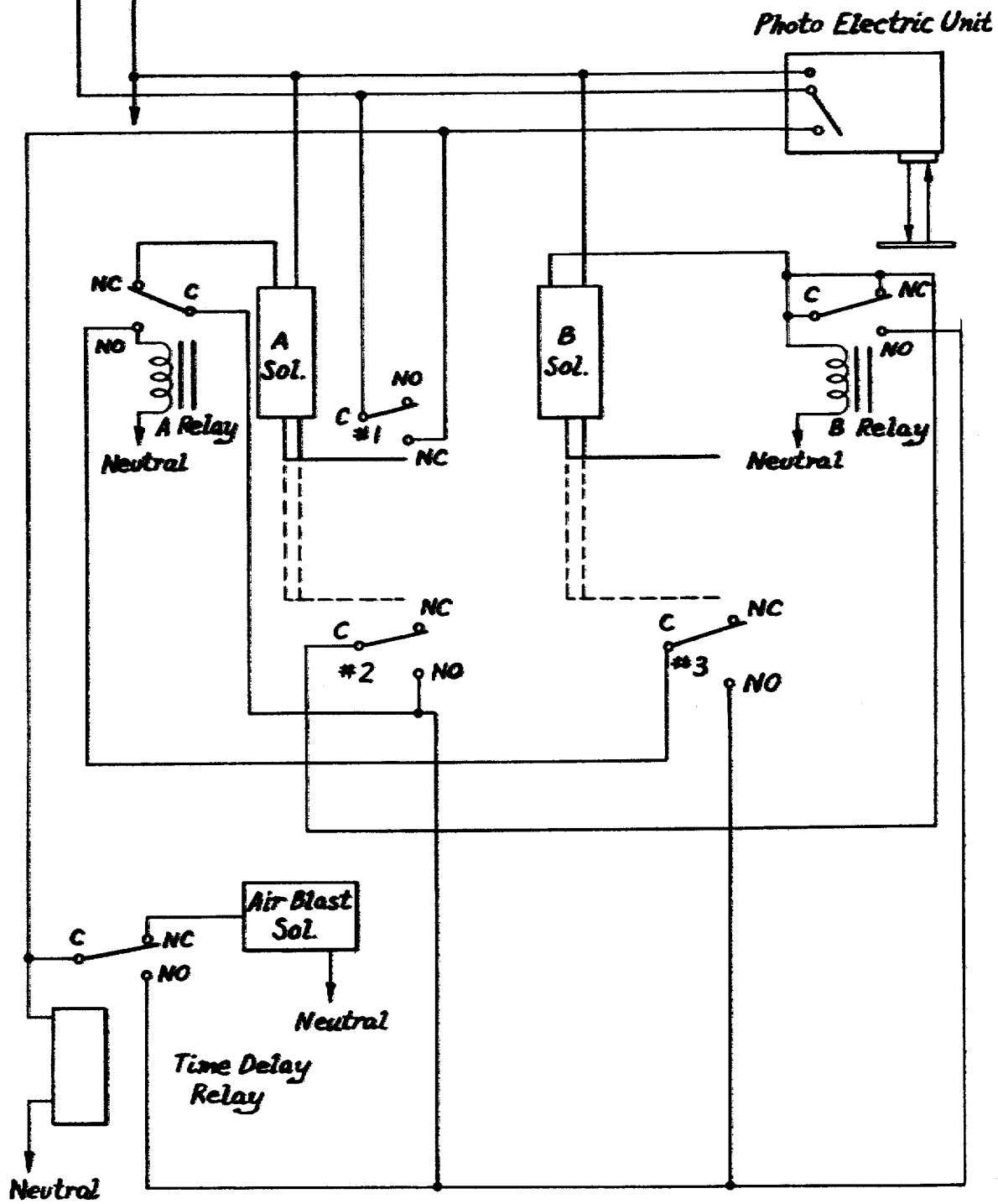

APPARATUS FOR MAKING PIZZAS OR THE LIKE

In the commercial manufacture of pizzas or pizza pies, particularly of the frozen variety, it has been the practice to place bases of thinly rolled bread dough on an advancing conveyor and then spread over the bases a spiced mixture, as of tomatoes, cheese, garlic, oil and the like, and then apply pizza meat, such as sausage meat or the like, thereto. In the usual practice, the pizza meat comes in frozen discs or the like, and a number of persons along the conveyor, wearing insulating gloves, break pieces of pizza meat from the frozen discs and manually deposit them on the pizzas, a time consuming and expensive procedure and one which often provides uneven distribution of the pizza meat on the pizzas. The pizzas so formed are then frozen for storage, distribution and sale purposes.

The principal object of this invention is to provide an apparatus for metering and distributing unfrozen pizza meat or the like in desired predetermined patterns onto the pizzas so as to produce uniform pizza products having desired meat distribution patterns and in a less expensive manner.

Briefly, in accordance with this invention, the apparatus includes a conveyor for advancing the pizzas and at least one metering and distributing head for the pizza meat above the advancing pizzas on the conveyor. The metering and distributing head comprises a housing having a supply station and means for feeding pizza meat thereto, a distributing station having distributing tubes for distributing metered pizza meat portions in a desired pattern onto the pizzas, a metering station having movable metering pistons for metering the meat portions to be distributed to the pizzas, and an air supply station having means for supplying air under pressure. The metering and distributing head also includes a movable core in the housing which, when moved to a first position, communicates the air supply station with the distributing station and communicates the supply station with the metering station, and which, when moved to a second position, communicates the metering station with the distributing station.

Means including control means are provided for moving the core and the metering pistons and operating the air supply means in timed relation. When the core is in its first position, metered portions of the pizza meat are distributed by air pressure from the distributing station through the distributing tubes to the pizzas and the metering pistons are retracted to receive pizza meat in the metering station from the supply station. When the core is in its second position, the metering pistons are advanced to project metered portions of the pizza meat from the metering station to the distributing station. The core, metering pistons and air supply are operated through a complete cycle when a pizza appears under the metering and distributing head and repetition of the operating cycle is prevented until another pizza appears under the metering and distributing head.

Other objects and advantages of this invention will become apparent to those skilled in the art upon reference to the accompanying specification, claims and drawings in which:

FIG. 8 is a wiring diagram of the control system for operating in timed relation the core, metering pistons and air supply of the metering and distributing head.

Figure 6:
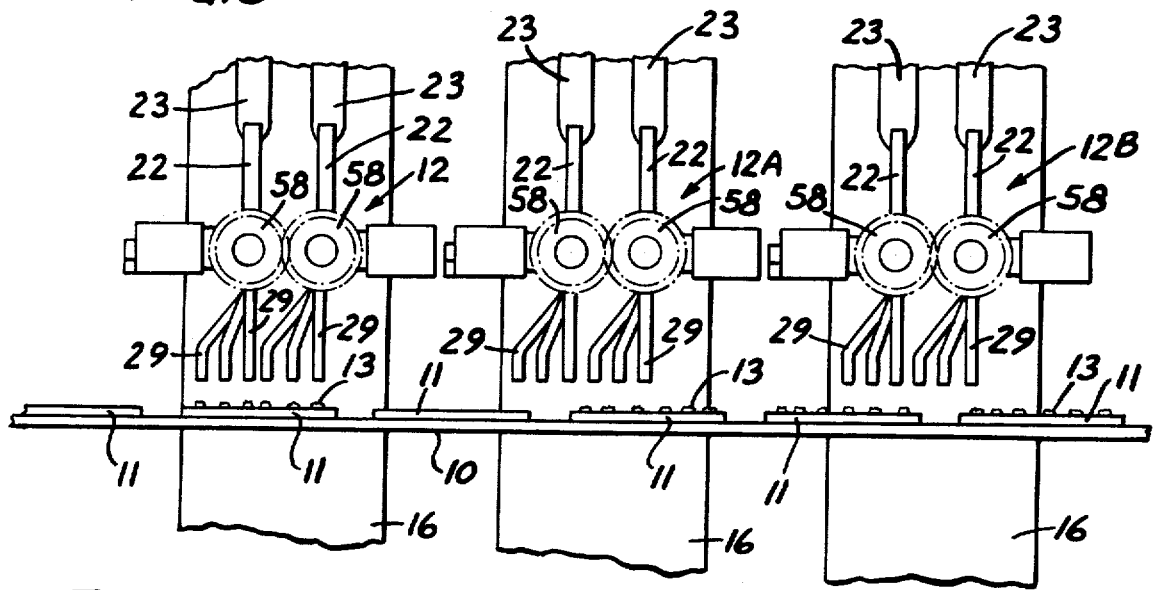
FIG. 6 is a diagrammatical side elevational view of an apparatus having a plurality of metering and distributing heads for metering and distributing pizza meat on pizzas arranged in rows on a conveyor.
Figure 7:
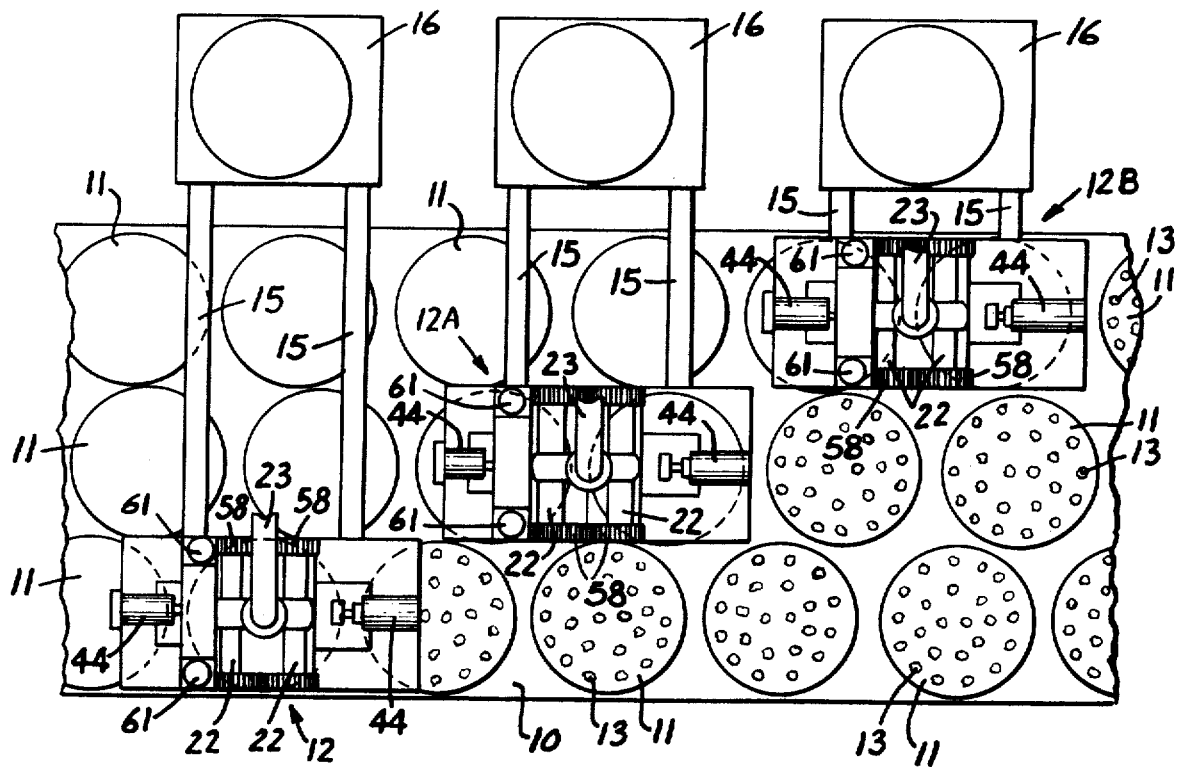
FIG. 7 is a top plan view of the multiple metering and distributing head apparatus illustrated in FIG. 6.

Referring now particularly to the drawings, the apparatus for making pizzas or the like includes a longitudinally moving conveyor 10 upon which the pizzas 11 (including the rolled bread dough and the spiced mixture, as of tomatoes, cheese, garlic, oil and the like) are arranged. The pizzas 11 may be arranged in rows on the conveyor 10 as illustrated in FIGS. 6 and 7. Above each row of pizzas 11 on the conveyor 10 is arranged a metering and distributing head 12, 12A and 12B, these metering and distributing heads being of the same construction. It is noted that these metering and distributing heads may be arranged in staggered relation along the conveyor 10 as illustrated in FIG. 7. These metering and distributing heads distribute metered portions of meat 13 in a desired pattern onto the pizzas 11. The metering and distributing heads are supported over the conveyor 10 by frames 15 carried by stands 16.

Figure 1:
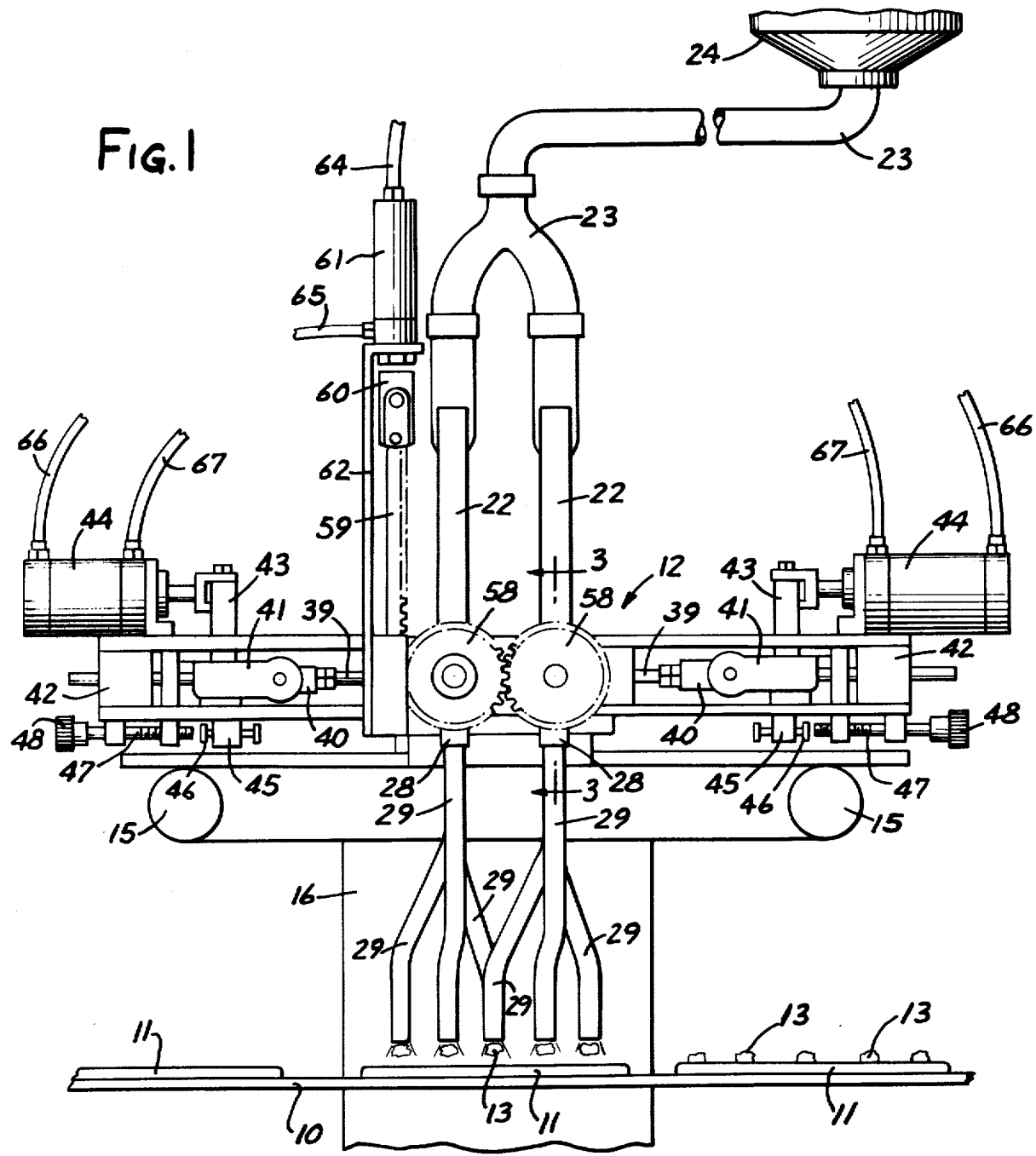
FIG. 1 is a side elevational view of the apparatus for making pizzas or the like, including one of the metering and distributing heads, and looking from the left of FIG. 2.
Figure 3:
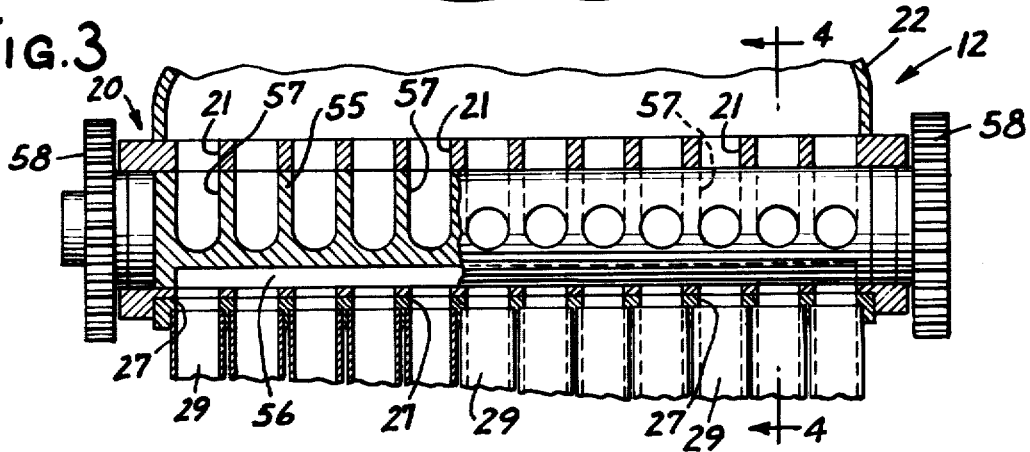
FIG. 3 is a sectional view through the metering and distributing head taken substantially along the line 3—3 of FIG. 1.
Figure 2:
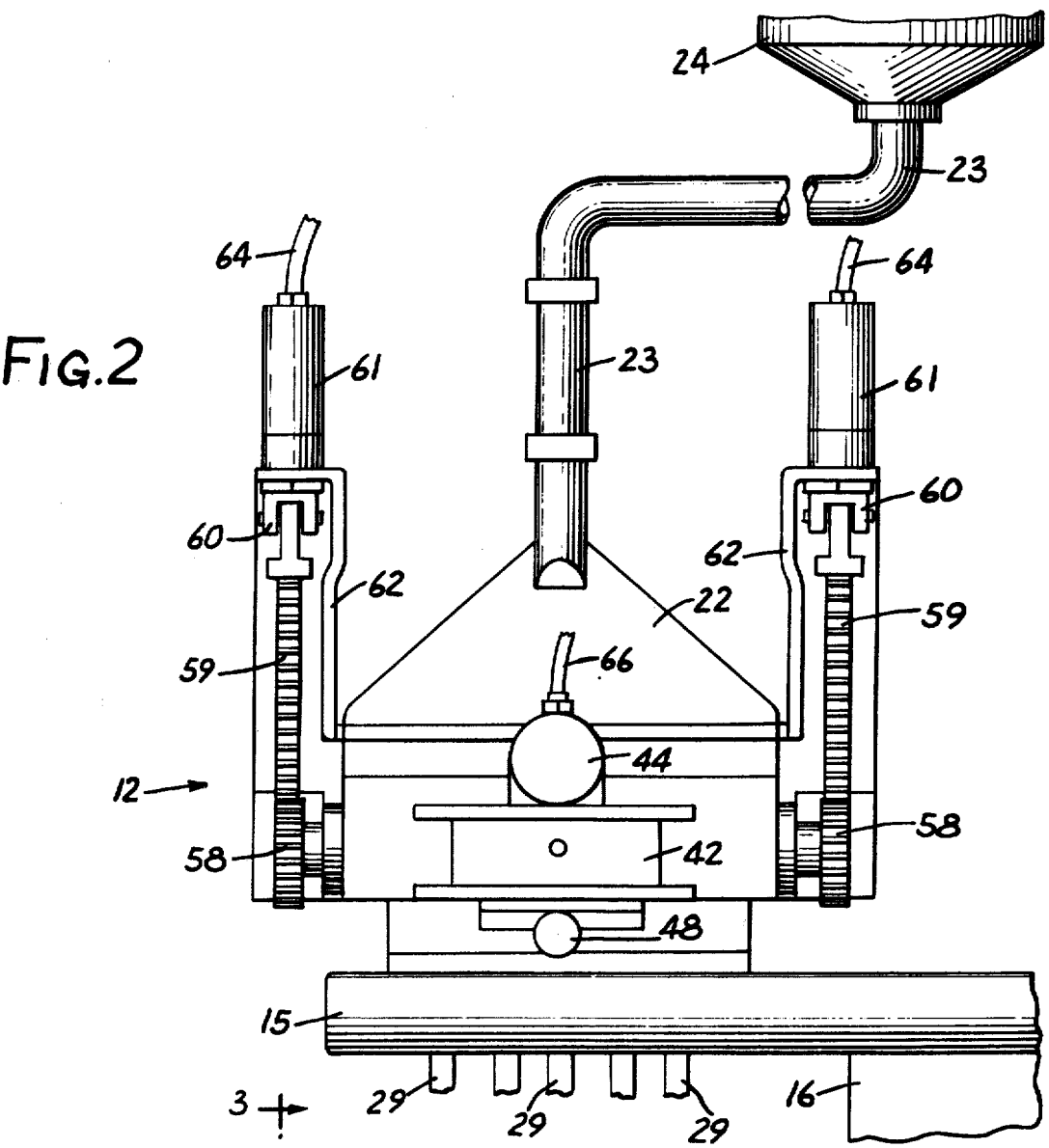
FIG. 2 is an end elevational view of the apparatus illustrated in FIG. 1, and looking from the right of FIG. 1.
Figure 4:
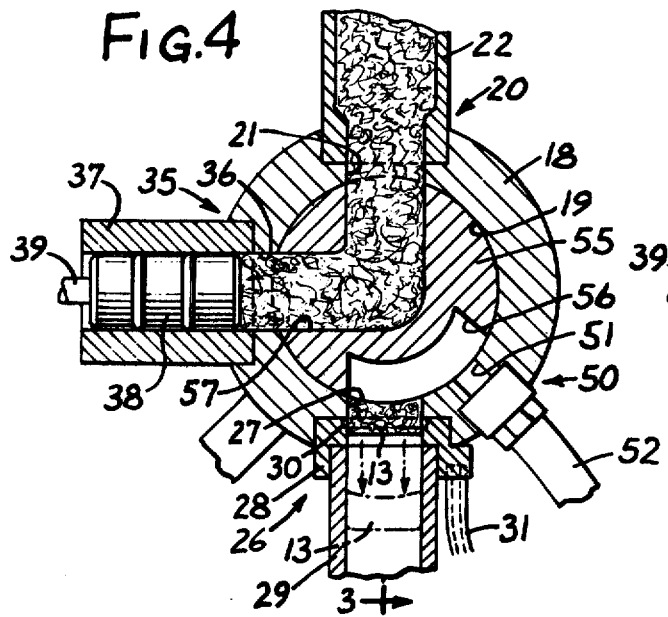
FIG. 4 is a sectional view through the metering and distributing head taken substantially along the line 4—4 of FIG. 3, and showing the rotatable core in the first position.
Figure 5:
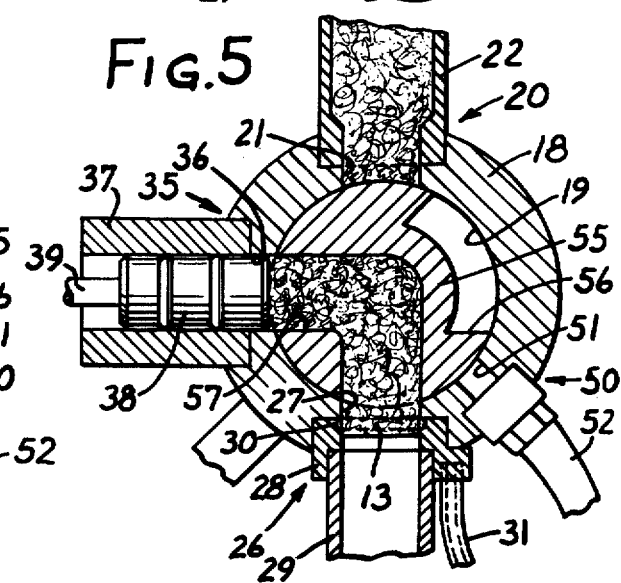
FIG. 5 is a sectional view similar to that of FIG. 4 but showing the rotatable core in the second position.

Each metering and distributing head includes, as illustrated in more detail in FIGS. 3, 4 and 5, an elongated cylindrical hollow housing 18 having a cylindrical cavity 19 therein. A supply station 20 extends longitudinally of the housing 18 and it includes a plurality of longitudinally spaced supply ports 21 extending into the cylindrical cavity 19. A manifold 22 received in the housing 18 is connected by conduits 23 to a container 24 carrying the pizza meat. This container 24 is connected to the manifolds 22 of the various metering and distributing heads by conduits 23. Pressure is applied to the meat in the container 24 so as to force feed the meat through the conduits 23 and manifolds 22 and the ports 21 in the meat supply station 20 into the cavity 19 of the housing 18.

Each elongated cylindrical hollow housing 18 of the metering heads is provided with a distributing station 26 which is circumferentially spaced from the supply station, diametrically opposite as illustrated in FIGS. 4 and 5. This distributing station 26 includes a plurality of longitudinally spaced distributing ports 27 which communicate with the interior 19 of the housing 18. A manifold 28 having ports communicating with the distributing ports 27 is provided with distributing tubes 29 which extend downwardly therefrom over the pizzas 11 in any desired pattern. Metered portions of the pizza meat are distributed from the metering ports 27 through the distributing tubes 29 to the pizzas. The manifold 28 is internally provided at each port therein with an annular oil groove 30 to which oil is supplied from a conduit 31 for lubricating purposes to aid in the distribution of the metered portions of pizza meat through the distributing tubes 29.

A metering station 35 also extends longitudinally of the housing and is circumferentially spaced between the supply station 20 and the distributing station 26, halfway between as illustrated in FIGS. 4 and 5. This metering station 35 includes a plurality of longitudinally spaced ports 36 in the housing 18 which communicate with the interior 19 of the housing. The metering station 35 also includes a manifold 37 having a plurality of openings therein communicating with the ports 36 and having located therein metering pistons 38. These metering pistons 38 are adapted to be retracted as shown in FIG. 4 and advanced as shown in FIG. 5, and in this connection the various metering pistons 38 are connected by rods 39 to a member 40 carried by a cross head 41 guided for reciprocation in a frame 42. The cross head 41 has an extension 43 which is connected to the piston of a pneumatic motor 44. When air is supplied through an air conduit 66, the pneumatic motor is operated in one direction to advance the pistons 38 from the position illustrated in FIG. 4 to the position illustrated in FIG. 5, and when air is supplied through the air conduit 67 the metering pistons 38 are retracted from the position illustrated in FIG. 5 to the position illustrated in FIG. 4. The advancing movement of the metering pistons 38 from the position illustrated in FIG. 4 to the position illustrated in FIG. 5 is fixed, however, the retracting movement of the metering pistons 38 from the position illustrated in FIG. 5 to the position illustrated in FIG. 4 is adjustable. In this latter connection, the cross head 41 is provided with an extension 45 which carries a stop 46 which is adapted to engage an adjustable stop 47 carried by the frame 42 and which is adjusted by the knob 48. In this way the stroke of the metering pistons 38 may be adjusted and hence adjust the amount of the metered portions of the pizza meat.

An air supply station 50 is located in the housing 18 adjacent the distributing station 26 and it includes an air supply port 51 communicating with the interior 19 of the housing 18. Air is supplied to the air supply port by an air conduit 52.

Located within the interior cavity 19 of the housing 18 is an elongated cylindrical rotary core 55 which is journaled and sealed at its ends in the housing 18. This core 55 includes a longitudinally extending cavity 56 which communicates the air supply port 51 with the distributing ports 27 when the core 55 is in the position illustrated in FIG. 4, and which is moved out of communication with the distributing ports 27 and the air supply port 51 when the core 55 is in the position illustrated in FIG. 5. The core 55 also includes a plurality of longitudinally spaced and substantially L-shaped meat conducting passages 57 therethrough for communicating the meat supply ports 21 with the metering ports 36 when the core 55 is in the first position illustrated in FIG. 4, and which communicate the metering ports 36 with the distributing ports 27 when the core 55 is in the second position as illustrated in FIG. 5. The cores 55 are rotated between the first and second positions by gears 58 which are connected to the cores at each ends thereof. The gears 58 mesh with each other for simultaneous rotation of the cores 55 in each metering and distributing head and these gears 58 are rotated by a pair of racks 59 which are connected at 60 to the pistons of the pneumatic motors 61. The motors 61 are carried by a frame 62 which also guides the racks 59 so as to keep them in mesh with the gears 58. Air is supplied to the pneumatic motors by conduits 64 and 65. When air is supplied through the conduits 65, the pneumatic motors 61 and racks 59 are operated to rotatably position the cores 55 in the first position as illustrated in FIG. 4, and when air is supplied through the conduits 64, the pneumatic motors 61 and the racks 59 operate to rotate the cores 55 to the second position as illustrated in FIG. 5.

Referring more particularly to FIGS. 4 and 5, when the core 55 is in the first position and the metering pistons 38 are in the retracted position, as illustrated in FIG. 4, meat is supplied under pressure from the supply ports 21 through the L-shaped meat conducting passages 57 into the metering ports 36 against the retracted metering pistons 38. At this same time, metered portions of meat are arranged in the distributing ports 27. Thus, when air is supplied through the air supply port 51 this air operating through the cavity 56 forcefully dislodges the metered portions of meat from the distributing ports 27 down through the distributing tubes 29 onto the pizzas 11, the oil in the oil grooves 30 lubricating the discharge of the metered portions of meat through the distributing tubes 29.

When the core 55 is rotated to the piston illustrated in FIG. 5, the metering pistons 38 are then advanced to force the meat from the metering ports 36 through the L-shaped meat conducting passages 57 into the distributing ports 27, thereby providing metered portions of the meat in the distributing ports 27, the amount of meat in the metered portions in the distributing ports being determined by the amount of previous retraction of the metering pistons 38. When the core 55 is rotated from the position illustrated in FIG. 5 back to the position illustrated in FIG. 4, the metered portions of the meat in the distributing ports 27 are then available for distribution through the distributing tubes 29 upon the application of air pressure through the air supply port 51. Also, when the core 55 is rotated in the position illustrated in FIG. 4 and the metering pistons 38 are retracted, an additional supply of meat under pressure is forced into the metering ports 36 for repetition of the cycle of operation.

The pneumatic motors 61 for rotating the cores 55, the pneumatic motors 44 for advancing and retracting the metering pistons 38 and the supply of air into the air supply port 51 are all operated in timed relation by a control system schematically illustrated in FIG. 8. The pneumatic motors 61 are connected by the air conduits 64 and 65 to a control valve which is operated by solenoid A illustrated in FIG. 8. When the solenoid A is de-energized the pneumatic motors 61 are operated to position the core 55 in the first position as illustrated in FIG. 4. When the solenoid A is energized the cores 55 are moved to the second position as illustrated in FIG. 5. The pneumatic motors 44 which advance and retract the metering pistons 38 are connected through the air conduits 66 and 67 to a valve operated by a solenoid B. When the solenoid B is de-energized the pneumatic motors position the metering pistons 38 in the retracted position as illustrated in FIG. 4. When the solenoid B is energized the metering pistons 38 are advanced as illustrated in FIG. 5. The supply of air through the air supply port 50 is controlled by a valve which in turn is operated by an air blast solenoid. Air is supplied when the air blast solenoid is energized. The cycle of operation is initiated by a photoelectric unit under the control of a light beam, the photoelectric unit being located under the metering and distributing head. When a pizza appears under the distributing head the light beam is broken and when this occurs, the photoelectric unit makes contact by closing its switch. When the light beam is re-established by movement of the pizza from under the metering and distributing head the photoelectric unit opens its switch and breaks contact.

The various parts as shown in FIG. 8 are in the deenergized condition so that the cores 55 and metering pistons 38 are in the positions illustrated in FIG. 4. When a pizza appears under the metering and distributing head the light beam of the photoelectric unit is broken to close its switch so that a circuit is completed from the hot line of the power input through the photoelectric unit switch and through C and the NC contact of a time delay relay to the air blast solenoid for turning on the air to the air port 51 for distributing the measured portions of the pizza meat onto the pizza under the metering and distributing head. The circuit is also completed through the time delay relay for a time interval of approximately 1 second. Upon operation of the time delay relay its switch is moved from the NC position to the NO position. This interrupts the supply of air to the air supply port 41 and completes an energizing circuit through the NO contact of the time delay relay the NC contact of A relay and A solenoid back to the neutral line. When this starting circuit for the A solenoid is completed, the A solenoid operates the No. 1 switch from its NO position to its NC position and as a result a maintaining circuit is completed from the hot line through C and the NC contact of the No. 1 switch and through the C and NO contact of the time delay relay, the C and NC contact of the A relay and solenoid A back to the neutral line. This locks in the A solenoid and shunts out the switch of the photoelectric unit so that the A solenoid will remain energized even though the photoelectric unit switch is subsequently opened. When the solenoid A is so energized and maintained energized, the core 55 rotates from the position shown in FIG. 4 to the position shown in FIG. 5. When the No. 1 switch is so operated upon energization of the A solenoid, the No. 2 switch is simultaneously operated to complete a circuit through the NO contact and C of the No. 2 switch and B solenoid back to neutral to energize the B solenoid. When the B solenoid is energized the metering pistons are advanced as illustrated in FIG. 5. At the time the B solenoid is thus energized, the B relay is simultaneously energized to close the NO contact thereof for completing a maintaining circuit through the B relay and to the B solenoid locking the same regardless of the operation of the No. 2 switch operated by the A solenoid. When the B solenoid is energized to advance the metering pistons 38 it also operates the No. 3 switch to close the NO contact to complete a circuit therethrough and energize the A relay. When the A relay is thus energized a locking circuit is completed through the NO contact thereof to maintain the same energized regardless of the No. 3 switch and to interrupt the circuit to the A solenoid whereupon it becomes de-energized to rotate the core 55 from the position illustrated in FIG. 5 to the position illustrated in FIG. 4. When the solenoid A is thus de-energized the No. 1 switch opens to remove power from the entire circuit if the photoelectric unit has cleared or opened its switch. As a result, the B solenoid is de-energized to retract the metering pistons 38 from the position illustrated in FIG. 5 to the position illustrated in FIG. 4, and also the A relay and B relay are also de-energized. The photoelectric unit must break its circuit and remake its circuit between the advance of pizzas 11 on the conveyor 10 in order to reset the entire circuit so as to repeat the cycle of operation. Therefore, the cycle of operation can only be started and repeated after metered portions of meat have been applied to a pizza and a subsequent pizza is advanced under the metering and distributing head for the purpose of distributing meat thereto.

In summary, when a pizza appears under the metering and distributing head with the core 55 in the position as illustrated in FIG. 4, metered portions of meat are distributed on the pizza by the action of air through the air port 51, then the core 55 is moved to the position as illustrated in FIG. 5 to present other metered portions of meat to the distributing ports 27 and following that, the core 55 is positioned back to the position of FIG. 4 to be ready for the next cycle of operation which is started only when the next succeeding pizza 11 on the conveyor 10 appears below the metering and distributing head.

A control system as illustrated in FIG. 8 is provided for each of the metering and distributing heads 12, 12A and 12B as illustrated in FIGS. 6 and 7 so that the application of pizza meat to the various rows of pizzas 11 on the conveyor 10 is individually controlled with respect to each row of pizzas. Therefore, irregularities in the spacing of the pizzas 11 on the web are accommodated by such individual control systems.

While for purposes of illustration three staggered metering and distributing heads have been illustrated so as to apply individually metered portions of meat to the three rows of pizzas 11 on the conveyor 10, this invention is applicable to a single row of pizzas 11 on the conveyor 10 if less production capacity is desired. Also, while each metering and distributing head 12, 12A and 12B is illustrated to include two interconnected cores 55 in the two housings 18, only 1 core 55 and housing 18 may be used if the number of metered portions of meat desired by the metering and distributing head can be accomplished by one core 55 and housing 18.

Where the pizza meat is of such temperature and consistency as to impede its free distribution through the distributing tubes 29, heating means may be provided for the tubes for heating the same to facilitate the free passage or distribution of the metered portions of the pizza meat therethrough. In this connection the distributing tubes 29 may extend through and be externally sealed in a manifold through which heated water or steam or the like may be circulated for heating purposes. Alternatively electrical heaters or other means may be utilized for heating the distributing tubes.

While one specific form of the apparatus of this invention for metering and distributing meat, or the like, in a desired pattern onto pizzas, or the like, on an advancing conveyor, other forms thereof may become apparent to those skilled in the art upon reference to this disclosure and, accordingly, this invention is to be limited only by the scope of the claims hereof.

We claim:

1. An apparatus for metering and distributing meat or the like in a desired pattern onto pizzas or the like including a conveyor for advancing the pizzas, a metering and distributing head for the meat above the advancing pizzas on the conveyor comprising a housing having a supply station and means for feeding meat thereto, a distributing station having distributing tubes for distributing meat in a desired pattern onto the pizzas, a metering station having movable metering pistons for metering the meat portions to be distributed to the pizzas, an air supply station having means for supplying air under pressure, a movable core in the housing which, when moved to a first position, communicates the air supply station with the distributing station and communicates the supply station with the metering station, and which, when moved to a second position, communicates the metering station with the distributing station, and means including control means for moving the core and the metering pistons and operating the air supply means in timed relation so that when said core is in its said first position, metered portions of the meat are distributed by air pressure from the distributing station to the pizzas and the metering pistons are retracted to receive meat in the metering station from the supply station, and so that when said core is in its said second position, the metering pistons are advanced to project metered portions of the meat from the metering station to the distributing station.

2. An apparatus as defined in claim 1 wherein means are provided for adjusting the stroke of the metering pistons of the metering station between the advanced and retracted positions for regulating the amount of the meat in the metered portions of meat conducted from the metering station to the distributing station.

3. An apparatus as defined in claim 1 wherein means are provided for supplying oil to the distributing station at the distributing tubes to facilitate distribution of the metered portions of meat through the distributing tubes.

4. An apparatus as defined in claim 1 wherein the movement of said core, the advancing and retracting of said metering pistons and the supply of air are controlled by solenoids, wherein a photoelectric unit detects the presence of a pizza on the conveyor below the metering and distributing head, and wherein said solenoids and photoelectric unit are electrically interconnected by interlocking relay circuits to provide a complete operating cycle when a pizza appears below the metering and distributing head and to prevent a repetition of the cycle until another pizza appears below the metering and distributing head.

5. An apparatus as defined in claim 1 wherein said metering and distributing head comprises a plurality of adjacent housings and movable cores therein and mechanical interconnections between said movable cores to provide simultaneous movement thereof.

6. An apparatus as defined in claim 5 wherein the means for feeding meat to the supply stations of the housings for the metering and distributing head comprises a source of meat under pressure and manifolding connecting said source to said supply stations.

7. An apparatus as defined in claim 1 wherein said conveyor is of such width to accomodate a plurality of rows of pizzas, and wherein a plurality of metering and distributing heads are provided with one head arranged above each row of pizzas on the conveyor.

8. An apparatus as defined in claim 7 wherein the plurality of metering and distributing heads are staggered longitudinally along the conveyor.

9. An apparatus as defined in claim 7 wherein the means for feeding meat to the supply stations of the housings of the metering and distributing heads comprises a source of meat under pressure and manifolding connecting said source to said supply stations.

10. An apparatus as defined in claim 1 wherein the means for feeding meat to the supply station of the housing for the metering and distributing head comprises a source of meat under pressure and a manifold connecting said source to said supply station.

11. An apparatus as defined in claim 1 wherein means are provided for heating the distributing tubes to facilitate distribution of the metered portions of meat through the distributing tubes.

12. An apparatus for metering and distributing meat or the like in a desired pattern onto pizzas or the like including a conveyor for advancing the pizzas, a metering and distributing head for the meat above the advancing pizzas on the conveyor and comprising an elongated cylindrical hollow housing having a supply station extending longitudinally of the housing and including a plurality of longitudinally spaced supply ports communicating with the interior of the housing and supply means for feeding meat through the supply ports, a distributing station extending longitudinally of the housing and circumferentially spaced from the supply station and including a plurality of longitudinally spaced distributing ports communicating with the interior of the housing and a plurality of distributing tubes for distributing meat from the distributing ports in a desired pattern onto the pizzas, a metering station extending longitudinally of the housing and circumferentially spaced between the supply station and the distributing station and including a plurality of longitudinally spaced metering ports communicating with the interior of the housing and a plurality of movable metering pistons associated with the metering ports for metering the meat portions to be distributed to the pizzas, and an air supply station adjacent the distributing station and circumferentially spaced therefrom and including an air supply port communicating with the interior of the housing and means for supplying air under pressure through the air supply port, an elongated cylindrical rotary core in the housing having a plurality of longitudinally spaced and substantially L-shaped meat conducting passages therethrough for communicating the supply ports and the metering ports when in a first rotative position and for communicating the metering ports and the distributing ports when in a second rotative position and also including an air passage for communicating the air supply port and the distributing ports when in said first rotative position, and means including control means for rotatably positioning said rotary core, for advancing and retracting said metering piston and for operating said air supply means in timed relation so that when said core is in its said first position, metered portions of the meat are distributed by air pressure from the distributing station to the pizzas and the metering pistons are retracted to receive meat in the metering station from the supply station, and so that when said core is in its said second position, the metering pistons are advanced to project metered portions of meat from the metering station to the distributing station.

13. An apparatus as defined in claim 12 wherein means are provided for adjusting the stroke of the metering pistons of the metering station between the advanced and retracted positions for regulating the amount of the meat in the metered portions of meat conducted from the metering station to the distributing station.

14. An apparatus as defined in claim 12 wherein means are provided for supplying oil to the distributing ports of the distributing station to facilitate distribution of the metered portions of meat through the distributing tubes.

15. An apparatus as defined in claim 12 wherein the rotation of said core, the advancing and retracting of said metering pistons and the supply of air are controlled by solenoids, wherein a photoelectric unit detects the presence of a pizza on the conveyor below the metering and distributing head, and wherein said solenoids and photoelectric unit are electrically interconnected by interlocking relay circuits to provide a complete operating cycle when a pizza appears below the metering and distributing head and to prevent a repetition of the cycle until another pizza appears below the metering and distributing head.

16. An apparatus as defined in claim 12 wherein means are provided for heating the distributing tubes to facilitate distribution of the metered portions of meat through the distributing tubes.

* * * * *